United States Patent
Hill

(10) Patent No.: US 10,234,641 B2
(45) Date of Patent: Mar. 19, 2019

(54) IN-LINE SEALED ADAPTER TUBE

(71) Applicant: Clearfield, Inc., Minneapolis, MN (US)

(72) Inventor: John Paul Hill, Andover, MN (US)

(73) Assignee: Clearfield, Inc., Minneapolis, MN (US)

( * ) Notice: Subject to any disclaimer, the term of this patent is extended or adjusted under 35 U.S.C. 154(b) by 0 days.

(21) Appl. No.: 15/618,832

(22) Filed: Jun. 9, 2017

(65) Prior Publication Data

US 2017/0357074 A1 Dec. 14, 2017

Related U.S. Application Data

(60) Provisional application No. 62/350,030, filed on Jun. 14, 2016.

(51) Int. Cl.
G02B 6/38 (2006.01)

(52) U.S. Cl.
CPC ................... G02B 6/3887 (2013.01)

(58) Field of Classification Search
CPC ... G02B 6/3825; G02B 6/3816; G02B 6/4215
See application file for complete search history.

(56) References Cited

U.S. PATENT DOCUMENTS

| | | | |
|---|---|---|---|
| 4,319,802 A | 3/1982 | Bowes | |
| 5,101,463 A | 3/1992 | Cubukciyan et al. | |
| 5,333,221 A * | 7/1994 | Briggs | G02B 6/3825 385/55 |
| 5,680,494 A * | 10/1997 | Kaas | G02B 6/3825 385/147 |
| 5,832,158 A * | 11/1998 | Chen | G02B 6/3816 385/53 |
| 6,053,639 A * | 4/2000 | Chen | G02B 6/3825 385/53 |
| 6,206,714 B1 | 3/2001 | Bernardini | |
| 6,609,837 B2 * | 8/2003 | Lampert | G02B 6/3825 385/55 |
| 7,234,877 B2 | 6/2007 | Sedor | |
| 7,428,366 B2 * | 9/2008 | Mullaney | G02B 6/3825 385/139 |
| 7,572,065 B2 * | 8/2009 | Lu | G02B 6/3816 385/55 |
| 7,614,799 B2 | 11/2009 | Bradley et al. | |
| 7,744,286 B2 * | 6/2010 | Lu | G02B 6/3816 385/53 |
| 7,744,288 B2 * | 6/2010 | Lu | G02B 6/3816 385/60 |

(Continued)

*Primary Examiner* — Rhonda S Peace
(74) *Attorney, Agent, or Firm* — Pepper Hamilton LLP

(57) ABSTRACT

In-line sealed adapter tubes configured to seal non-hardened connectors when connected with hardened connectors such as an outdoor rated connectors. An adapter tube for sealing a non-hardened connector comprises an adapter body having a first end and a second end opposite the first end. The adapter tube further comprises a first adapter endcap configured to couple to the first end and further configured to receive a hardened connector. The adapter tube further comprises a second adapter endcap configured to couple to the second end and further configured to receive a non-hardened connector for coupling to the hardened connector, such that the non-hardened connector is disposed within the adapter body.

14 Claims, 3 Drawing Sheets

(56) References Cited

U.S. PATENT DOCUMENTS

| | | | | |
|---|---|---|---|---|
| 7,762,726 B2* | 7/2010 | Lu | ............... | G02B 6/3816 |
| | | | | 385/53 |
| 7,785,016 B2* | 8/2010 | Luther | ............ | G02B 6/3885 |
| | | | | 385/55 |
| 7,785,019 B2* | 8/2010 | Lewallen | ......... | G02B 6/3817 |
| | | | | 385/53 |
| 7,942,590 B2* | 5/2011 | Lu | ............... | G02B 6/3816 |
| | | | | 385/78 |
| 7,959,361 B2* | 6/2011 | Lu | ............... | G02B 6/3816 |
| | | | | 385/53 |
| 8,202,008 B2* | 6/2012 | Lu | ............... | G02B 6/3816 |
| | | | | 385/53 |
| 8,483,537 B2* | 7/2013 | Zeng | ............. | G02B 6/4472 |
| | | | | 385/137 |
| 8,622,627 B2* | 1/2014 | Elkins, II | ......... | G02B 6/3825 |
| | | | | 385/73 |
| 8,708,732 B2* | 4/2014 | Toda | ............. | H01R 13/622 |
| | | | | 439/352 |
| 8,942,532 B2 | 1/2015 | Greub et al. | | |
| 9,122,021 B2 | 9/2015 | Elenbaas et al. | | |
| 9,304,262 B2* | 4/2016 | Lu | ............... | G02B 6/3821 |
| 9,482,829 B2* | 11/2016 | Lu | ............... | G02B 6/3816 |
| 9,733,436 B2* | 8/2017 | Van Baelen | ..... | G02B 6/3887 |
| 9,864,156 B1* | 1/2018 | Menguy | ......... | G02B 6/02395 |
| 10,025,038 B2* | 7/2018 | Mueller-Schlomka | ............. | |
| | | | | G02B 6/3894 |
| 2008/0175541 A1* | 7/2008 | Lu | ............... | G02B 6/3816 |
| | | | | 385/62 |
| 2017/0357059 A1* | 12/2017 | Mueller-Schlomka | ............. | |
| | | | | G02B 6/3894 |
| 2017/0357074 A1* | 12/2017 | Hill | ............... | G02B 6/4459 |
| 2018/0024294 A1* | 1/2018 | Wang | ............. | G02B 6/255 |
| | | | | 385/78 |

* cited by examiner

IN-LINE SEALED ADAPTER TUBE

CROSS-REFERENCE TO RELATED APPLICATION

This application claims the benefit of U.S. Provisional Application No. 62/350,030, filed Jun. 14, 2016.

BACKGROUND

The present disclosure relates generally to optical fiber systems, and specifically to adapter tubes for sealing optical fiber connectors.

Data, voice, and other communication networks are increasingly using fiber optics to carry information. An optical fiber connector is a mechanical device disposed at an end of an optical fiber, and acts as a connector of optical paths, for example when optical fibers are joined to each other. An optical fiber connector may be coupled with an adapter to connect an optical fiber cable to other optical fiber cables or devices. An adapter generally includes a housing, or portion of a housing, having at least one port which is configured to receive and hold a connector to facilitate the optical connection of one connector to another connector or other device.

Fiber optic connectors are deployed in many harsh outdoor environments within today's communication networks. In external applications wherein the adapters and connectors may be exposed to weather, such as rain or moisture, the connectors may be configured to be waterproof for outdoor use.

There are many types of hardened fiber optic connectors including Corning's harsh environment OptiTap connector and other outdoor rated connectors. A harsh environment connector may typically be mated to an adapter and to a non-hardened connector, such as an industry standard connector or Clearfield's Fieldshield pushable connector, by way of a wall box, terminal or cabinet, thereby protecting industry standard connector or Clearfield's Fieldshield pushable inside these bulky structures/devices. Sealing off an industry standard connector or Clearfield's Fieldshield pushable connector may also be accomplished through a heat shrink. However, the method of sealing using a heat shrink is generally not used because a heat shrink does not allow re-entry and reusability.

Accordingly, there is a need for a system to conveniently seal off a non-hardened connector, such as an industry standard connector or Clearfield's Fieldshield pushable connector, from the environment, while also allowing re-entry and reusability of the sealing system.

SUMMARY

Aspects of the present disclosure address the aforementioned problems by providing systems for sealing a non-hardened connector, such as an industry standard connector or Clearfield's Fieldshield pushable connector, so as to protect it from the environment when mated with a hardened connector such as Corning's OptiTap or other outdoor rated connector or even sealed into a duct. Various embodiments provide an in-line sealed adapter tube configured to seal a non-hardened connector when connected with a hardened connector such as an outdoor rated connector.

Embodiments disclosed herein have several advantages. For example, various embodiments of the in-line sealed adapter tubes allow environmentally protected use of industry standard connectors, allow ease of use, may be re-entered for maintenance or trouble shooting, and are reusable.

According to one aspect, there is disclosed an adapter tube for sealing a non-hardened connector. The adapter tube comprises an adapter body having a first end and a second end opposite the first end. The adapter tube further comprises a first adapter endcap configured to couple to the first end and further configured to receive a hardened connector. The adapter tube further comprises a second adapter endcap configured to couple to the second end and further configured to receive a non-hardened connector for coupling to the hardened connector, such that the non-hardened connector is disposed within the adapter body.

In some embodiments, at least one of the first adapter endcap and the second adapter endcap is configured to couple to the adapter body by snap fit. In some embodiments, at least one of the first end and the second end includes a slot configured to receive a cable tie for secondary retention. In some embodiments, the adapter body is symmetrical.

Various embodiments may further comprise a first seal configured to couple to the first end, and a second seal configured to couple to the second end. For example, each of the first seal and the second seal may be an O-ring. In various embodiments, the adapter body may comprise a single housing.

DETAILED DESCRIPTION

Figure 1:
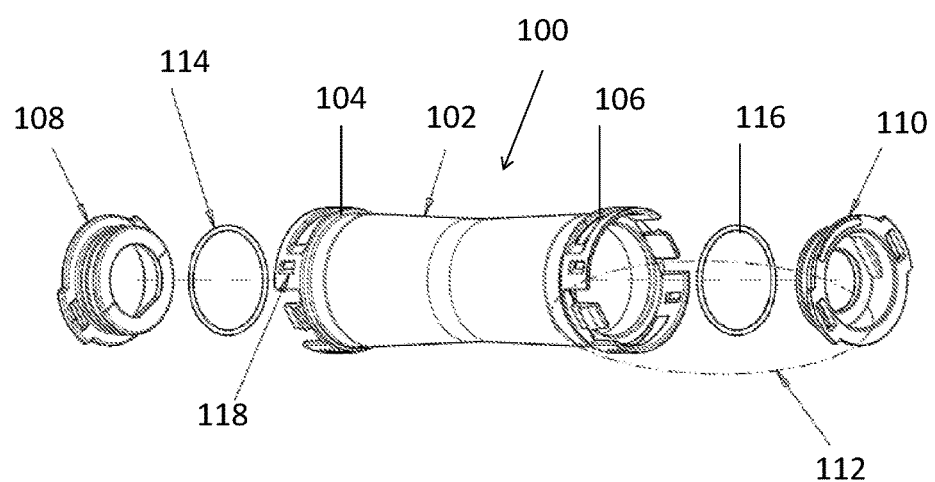
FIG. 1 shows an exploded view of an in-line sealed adapter tube configured according to aspects of the present disclosure.

FIG. 1 shows an expanded view of one embodiment of an in-line sealed adapter tube 100. The adapter tube 100 includes an adapter body 102, a first end 104 and a second end 106 opposite the first end. The first end 104 is configured to couple to a first adapter endcap 108. The second end 106 is configured to couple to a second adapter endcap 110. Each of the first end 104 and the second end 106 is configured to snap fit a respective adapter endcap. For example, as shown by the dotted circle 112, the second end 106 includes a tab configured to engage an opening on the second adapter endcap 110. In some embodiments, the adapter body 102 may be symmetrical so that the adapter endcaps may go on either end. In various embodiments, the adapter body 102 may comprise a single housing.

The in-line sealed adapter tube 100 further includes a first seal 114 disposed at the first end 104, and includes a second seal 116 disposed at the second end 106. For example, each of the first seal 114 and the second seal 116 may be an O-ring. Each of the first end 104 and the second end 106 may further include slots 118 configured to receive cable ties for secondary retention. In various embodiments, the adapter body and the adapter endcaps may be custom molded parts.

Figure 2:
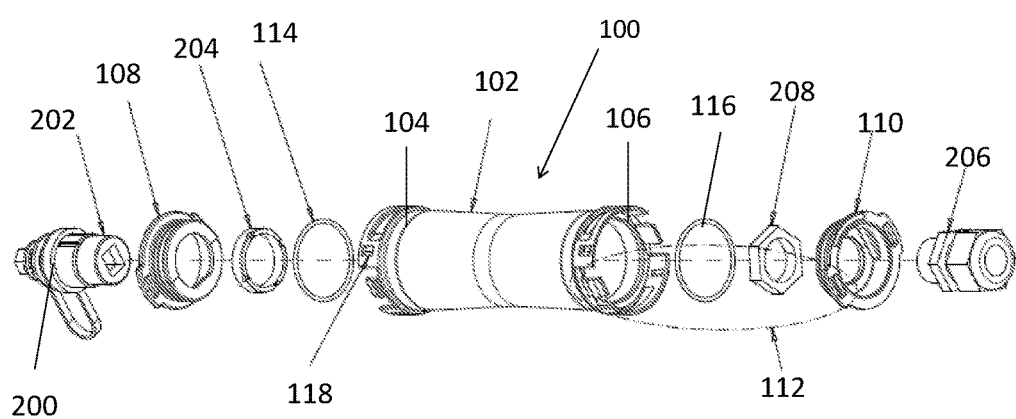
FIG. 2 shows an exploded view of the in-line sealed adapter tube of FIG. 1, configured to receive connectors according to aspects of the present disclosure.

FIG. 2 further shows the adapter tube 100 being configured to receive connectors. The first adapter endcap 108 is configured to receive a hardened connector 200. For example, the hardened connector 200 may be an OptiTap connector, or any other harsh environment or outdoor connector. The hardened connector 200 is coupled to an adapter 202. The adapter tube 100 may further be configured to receive a hardened connector nut 204, such as an OptiTap nut. Further, the second adapter endcap 110 may be configured to receive a fitting, such as an NPT fitting. In one example, the adapter endcap 110 may be sized for 0.5 inch NPT fitting. The second adapter endcap 110 may be configured to receive a fitting, such as a Sealcon fitting 206, and a nut 208, such as a Sealcon nut. Thus, one end of the adapter tube may be configured to couple to a hardened connector, whereas the other end may be configured to receive a non-hardened connector, such as an industry standard connector or Clearfield's Fieldshield pushable connector. The non-hardened connector is thus protected within the adapter body 102 and sealed off from the environment.

Figure 3:
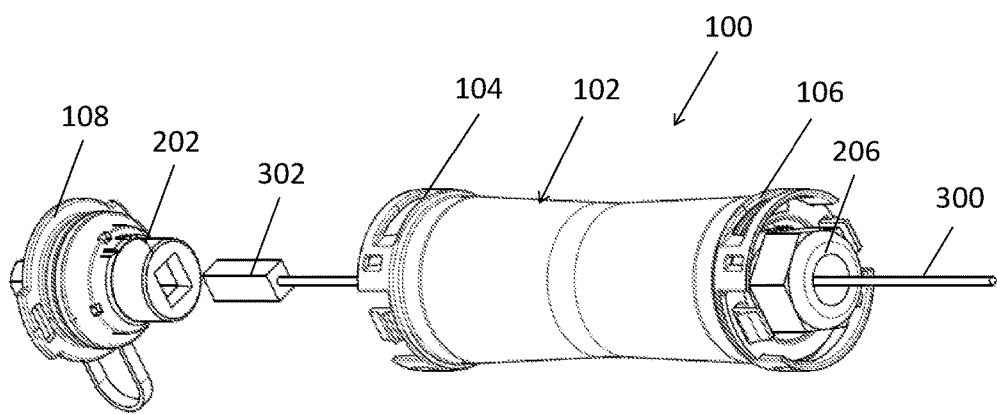
FIG. 3 shows a partially assembled view of the in-line sealed adapter tube of FIG. 1, having received a non-hardened connector according to aspects of the present disclosure.

FIG. 3 shows a partially assembled view of the in-line adapter tube 100. As shown, the second end 106 is configured to receive an optical fiber cable 300 coupled to a non-hardened connector 302. The non-hardened connector may be an industry standard connector or Clearfield's Fieldshield pushable connector. As the non-hardened connector 302 is coupled to the adapter 202, it is pushed through the adapter tube 100, and disposed within the adapter body 102, thereby being protected and sealed off from the environment.

In various embodiments, in-line adapter tubes are configured to receive optical fiber cables of various sizes. Various embodiments disclosed herein may include "off the shelf" components such as O-rings, Sealcon fittings, and Sealcon nuts.

This disclosure is not limited to the particular systems, devices and methods described, as these may vary. The terminology used in the description is for the purpose of describing the particular versions or embodiments only, and is not intended to limit the scope.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. An adapter tube for sealing a non-hardened connector, the adapter tube comprising:
    an adapter body having a first end and a second end opposite the first end, wherein the first end and the second end are symmetrical;
    a first adapter endcap configured to couple to the first end and further configured to receive a hardened connector;
    a second adapter endcap configured to receive a fitting and a non-hardened connector through a central opening thereof for coupling to the hardened connector, such that the non-hardened connector is disposed within the adapter body;
    wherein the second end has a tab protruding from an edge thereof and the second adapter endcap has a peripheral opening configured to receive the tab so as to couple the second adapter endcap to the second end; and
    wherein the first adapter endcap and the second adapter endcap are configured to interchangeably fit the first end and the second end.

2. The adapter tube of claim 1, wherein at least one of the first adapter endcap and the second adapter endcap is configured to couple to the adapter body by snap fit.

3. The adapter tube of claim 2, wherein at least one of the first end and the second end includes a slot configured to receive a cable tie for secondary retention.

4. The adapter tube of claim 1, wherein the adapter body is symmetrical.

5. The adapter tube of claim 1, further comprising a first seal configured to couple to the first end, and a second seal configured to couple to the second end.

6. The adapter tube of claim 5, wherein each of the first seal and the second seal is an O-ring.

7. The adapter tube of claim 1, wherein the adapter body comprises a single housing.

8. An adapter tube for sealing a non-hardened connector, the adapter tube comprising:
    an adapter body having a first end and a second end opposite the first end;
    a first adapter endcap configured to couple to the first end and further configured to receive a hardened connector;
    a second adapter endcap configured to receive a non-hardened connector through a central opening thereof for coupling to the hardened connector, such that the non-hardened connector is disposed within the adapter body;
    wherein the first adapter endcap and the second adapter endcap are configured to interchangeably fit the first end and the second end.

9. The adapter tube of claim 8, wherein at least one of the first adapter endcap and the second adapter endcap is configured to couple to the adapter body by snap fit.

10. The adapter tube of claim 9, wherein at least one of the first end and the second end includes a slot configured to receive a cable tie for secondary retention.

11. The adapter tube of claim 8, wherein the adapter body is symmetrical.

12. The adapter tube of claim 8, further comprising a first seal configured to couple to the first end, and a second seal configured to couple to the second end.

13. The adapter tube of claim 12, wherein each of the first seal and the second seal is an O-ring.

14. The adapter tube of claim 8, wherein the adapter body comprises a single housing.

* * * * *